United States Patent [19]

Leighton

[11] 4,297,550

[45] Oct. 27, 1981

[54] METHOD AND CONSTRUCTION FOR VEHICLE BRAKE PEDAL AND SWITCH ASSEMBLY

[75] Inventor: John D. Leighton, Bloomfield Hills, Mich.

[73] Assignee: Betty Leighton, Bloomfield Hills, Mich. ; a part interest

[21] Appl. No.: 16,434

[22] Filed: Mar. 1, 1979

[51] Int. Cl.³ .............................................. H01H 3/14
[52] U.S. Cl. .................................. 200/61.89; 74/512; 74/514; 340/69; 340/71
[58] Field of Search ............... 200/61.89, 61.86, 61.87, 200/61.88, 61.9, 61.91; 340/71, 69, 66, 67; 74/512, 514

[56] References Cited

U.S. PATENT DOCUMENTS

2,881,278   4/1959   Gores ................................. 340/69X
3,404,246  10/1968   Stimpson ......................... 200/61.89

*Primary Examiner*—J. V. Truhe
*Assistant Examiner*—Morris Ginsburg
*Attorney, Agent, or Firm*—Harness, Dickey & Pierce

[57] ABSTRACT

A method and construction for assembling the brake pedal and associated switches and valve for an automotive vehicle in the vehicle so as to insure consistent operation and reduce assembly time. The construction comprises a bracket securable to the vehicle firewall and carrying the brake pedal lever which is hinged thereto by a torsionable rubber sleeve bonded to inner and outer metal sleeves or by a spring-like portion of the lever. The resilient hinge is biased so as to urge the brake pedal lever away from the firewall, and one or more switches and valves are carried by the bracket or brake pedal lever in a manner which will cause operation of the switches and valves when the brake pedal is actuated. The method of the invention includes the steps of assembling a module comprising the bracket, brake pedal lever switches and in some cases a portion of a push rod, biasing the hinge, connecting the module to the brake cylinder and securing it to the firewall.

31 Claims, 16 Drawing Figures

METHOD AND CONSTRUCTION FOR VEHICLE BRAKE PEDAL AND SWITCH ASSEMBLY

BACKGROUND OF THE INVENTION

1. Field of the Invention

The invention relates to automotive vehicle brake pedals, brake light switches and other appurtenances such as cruise control switches and valves and torque convertor lock cut-out switches which are conventionally operated in response to pressure exerted on the brake pedal.

2. Description of the Prior Art

Conventionally, brake pedal units for automotive vehicles are assembled part by part, with the support bracket first being secured to the firewall and the brake pedal lever then hinged thereto. A wire spring may be mounted between the lever and bracket to urge the lever rearwardly although normally this function is served by a large return spring in the brake booster or master cylinder. A brake light switch is then secured to the bracket or a lateral extension of the lever and the lever is connected by a push rod with the braking system. In some cases the push rod consists of two parts, with a female push rod end extending rearwardly from the braking system through the firewall, and a male push rod part slipping into the female part and hinged to the brake pedal lever.

This construction leads to problems during assembly because the tolerances involved make it difficult to assure proper operation of the brake light switch when the pedal is depressed. After connection of the brake pedal lever to the braking system, the operator sets the brake light switch by manually pulling the pedal back until the push rod engages a stop in the brake pedal system such as the booster. He then must adjust the brake light switch. This requires the operator to reach under the dashboard adjacent the firewall while at the same time watching the lights at the rear of the car.

A brake pedal lever assembly having a torsionable hinge like that used in the present invention is shown in my U.S. Pat. No. 4,130,027 issued Dec. 19, 1978.

BRIEF SUMMARY OF THE INVENTION

It is an object of the present invention to provide an improved method and construction for a vehicle brake pedal and switch assembly which overcomes the above described disadvantages of previous constructions and offers a modular system which can be pre-assembled before reaching the final assembly line, so that the entire module can be secured to the firewall and connected to the braking system without having to adjust the brake light switch or other switches or valves on the assembly line itself.

It is another object to provide an improved method and apparatus of this nature which assures consistent pedal effort from car to car by avoiding a build-up of tolerances among connected parts which could lead to pedal effort variations.

It is another object to provide a novel method and apparatus of this character which greatly reduces the labor and time required for brake pedal and light switch assembly while improving reliability of operation.

It is a further object to provide an improved construction of this nature which is compact as compared with previous constructions and thus saves space, a particularly important advantage in small cars.

It is also an object to provide a method and construction having these characteristics, which is usable for a variety of different switches and valves which are responsive to brake pedal operations.

It is another object to provide an improved construction of this nature which can be used with a variety of different brake pedal switches, whether mounted on the bracket, on the lever or in the brake pedal itself.

Briefly, the method of this invention comprises the steps of providing a pre-assembled module having a firewall mounting bracket member, a brake pedal lever member hinged thereto, resilient means urging said lever member rearwardly, and a switch carried by one of said members, connecting said lever member to a brake system push rod member, mounting said module on a vehicle firewall, and connecting a lead wire to said switch, whereby relative movement between a selected two of said members caused by forward movement of said lever member will actuate said switch.

The apparatus according to the invention briefly comprises a pre-assembled vehicle brake pedal lever and switch module having a firewall mounting bracket member, a brake pedal lever member hinged thereto, resilient means urging said lever member rearwardly, and a switch carried by one of said members, said lever member having means for connection to a brake system push rod member on the vehicle, whereby relative movement between a selected two of said members caused by forward movement of said lever member after said module has been mounted on said vehicle firewall will actuate said switch.

DESCRIPTION OF THE PREFERRED EMBODIMENTS

Figure 1:
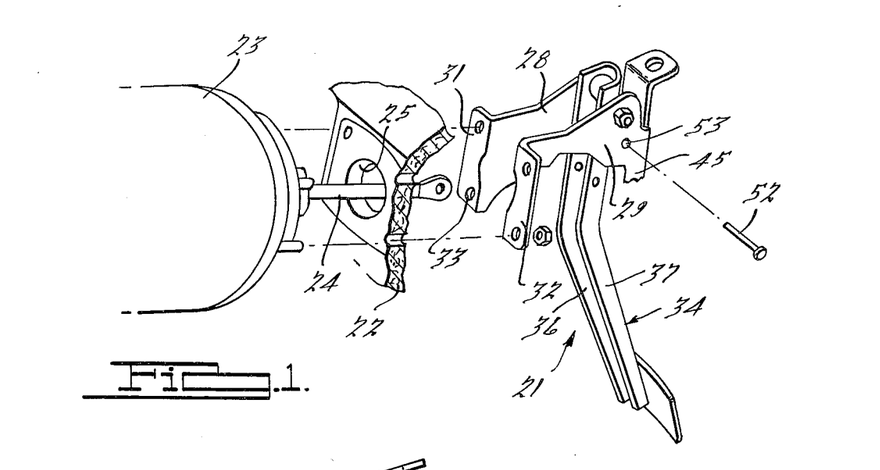
FIG. 1 is an exploded perspective view of one embodiment of the invention showing how the pre-assembled module is assembled to the firewall and connected to the brake booster assembly.

Referring first to the embodiment shown in FIGS. 1, 2 and 3, the brake pedal and switch module is generally indicated at 21 and is intended to be pre-assembled and later mounted as a module on the firewall 22 of an automotive vehicle. The forward side of this firewall has a braking system of which the booster 23 is shown in FIG. 1. A push rod extending rearwardly from the booster is indicated at 24, and this extends through an aperture 25 in the firewall and is connected during final assembly with module 21. Instead of a single member, the push rod could comprise two sections as described in detail with regard to FIGS. 11 through 14.

The module 21 comprises a mounting bracket 26 having a web portion 27 and a pair of parallel flanges 28 and 29. These flanges are bent outwardly at 31 and 32 respectively in order to secure the module to the firewall through bolt holes 33.

A brake pedal lever generally indicated at 34 is hinged to bracket 26. Lever 34 has a web 35 and a pair of flanges 36 and 37, the lower end carrying a brake pedal 38. The means for hinging the brake pedal lever on the bracket includes means for constantly urging the brake pedal rearwardly. This is a construction similar to that shown in my aforementioned U.S. Pat. No. 4,130,027, comprising a pair of outer sleeves 39 and 40 secured to the upper end of the brake pedal lever and an inner sleeve 41 secured between flanges 28 and 29 of the bracket by a bolt 42. A rubber bushing 43 is disposed between these sleeves and is bonded thereto. Sleeve 41 is secured between the bracket flanges by teeth 44 and bolt 42 in such a way that in its normal position brake pedal lever 34 will be constantly urged counterclockwise in FIG. 2.

A downwardly extending support 45 on web 27 of bracket 26 carries a brake stop light switch assembly 46 and a cruise control vacuum release valve assembly 47. It will be understood that other switches such as a torque convertor lock cut-out switch and a cruise control switch could also be mounted on support 45. The switch and valve are so mounted that they face web 35 of the brake pedal lever so that when this lever is moved rearwardly the switch will be opened and the valve closed.

Push rod 24 is, during final assembly, pivotally connected at 48 to an intermediate portion of brake lever 34. This connection is shown by means of a pivot pin extending between the brake pedal lever flanges and passing through an opening at one end of member 24, the pin being held in place by a cotter pin 49.

When pre-assembling module 21 at the factory before it is installed in the vehicle, switch 46 and valve 47 may initially be backed off and rubber bushing 43 secured in an unstressed position with lever 34 against extension 45. The brake pedal lever is then moved forwardly, for example by placing the module in a fixture, and rubber bushing 43 stressed by the clockwise rotation of the lever, for example to the position partially indicated in dot-dash lines at 51 in FIG. 2. A temporary pin 52 (FIG. 1) may then be inserted in an aperture 53 of bracket flange 29 and an aperture 54 in the brake pedal lever, which apertures will be aligned as the lever is held in its forward position. The switch 46 and valve 47 may then be adjusted, for example by just touching the surface of web 35 of the brake pedal lever. This may be done by the threaded mountings 55 and 56 of the switch and valve respectively.

The module 21 is then brought to the vehicle on the assembly line. Push rod 24 is connected to lever 34 by pin 48. After the push rod has been connected, bracket 26 may be secured to firewall 22 and the switch and valve connected to a wire 64 and a hose 65 respectively (FIG. 2). The temporary pin 52 may then be withdrawn and the stressed rubber bushing 43 will cause brake pedal lever 34 to be urged rearwardly against switch 46 and valve 47.

Alternatively, the temporary pin may be dispensed with, and lever 34 being moved forwardly only during final assembly, for connection to push rod 24. In such case, the switch and valve would be adjusted after the mounting bracket has been secured to the firewall.

In operation of the assembly after it has been installed in the vehicle, brake booster 23 will conventionally have interior leaf springs 73 which can receive a ball 74 formed at the end of push rod 24. Springs 73 together with the valve and switch will act as stops to limit the rearward movement of the push rod. Ball 74 engages a portion 75 of the braking system, which also may have a spring shown schematically at 76 urging the push rod to the right in FIG. 2 against the stops. When in this position brake stop light switch 46 will be open and vacuum release valve 47 closed. Pressure on brake pedal 38 will move the lever clockwise to actuate the braking system while at the same time permitting switch 46 to close and opening valve 47.

Figures 3, 4, 5:
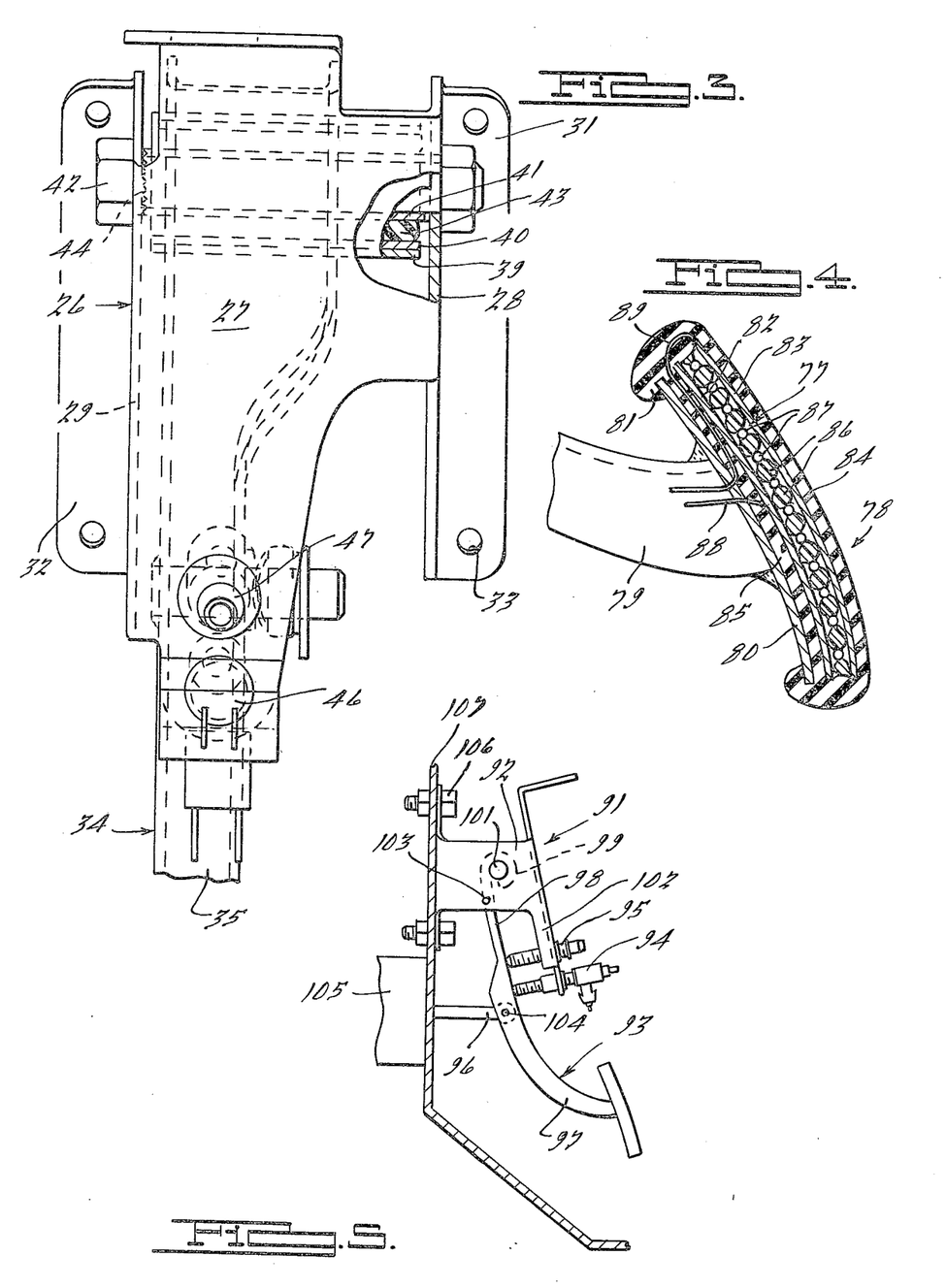
FIG. 3 is a rear elevational view taken in the direction of the arrow 3 of FIG. 2.
FIG. 4 is a fragmentary cross-sectional view in elevation showing another embodiment of the invention in which the switch is embedded in the brake pedal.
FIG. 5 is a side elevational view of still another embodiment of the invention in which the resilient means for urging the brake pedal lever rearwardly comprises a spring-like portion of this lever.

FIG. 4 illustrates another embodiment of the switch portion of the invention in which the brake stop light switch, generally indicated at 77, is incorporated in the brake pedal itself, the later being indicated generally at 78. Pedal 78 is secured to the lower end of brake pedal lever 79 and comprises a steel plate 80 and a rubber or other resilient cover having flanges 81 overlapping the edges of plate 80. A pair of electrically conductive contacts 82 and 83 are provided in the form of flat metallic members disposed between the outer layer 84 and the inner layer 85 of the cover. A thin silicone strip 86 having metal balls 87 molded therein is disposed between contacts 82 and 83. The material comprising the silicone strip and metal balls is known by the trademark "Press-Ex" sold by Essex International of Detroit, Mich. A pair of wire leads 88 and 89 are connected to plates 82 and 83 respectively. Wire 89 is embedded in resilient layer 85 and, together with wire 88 extends under the web of channel-shaped brake pedal lever 79 to the brake light circuit.

Figure 2:
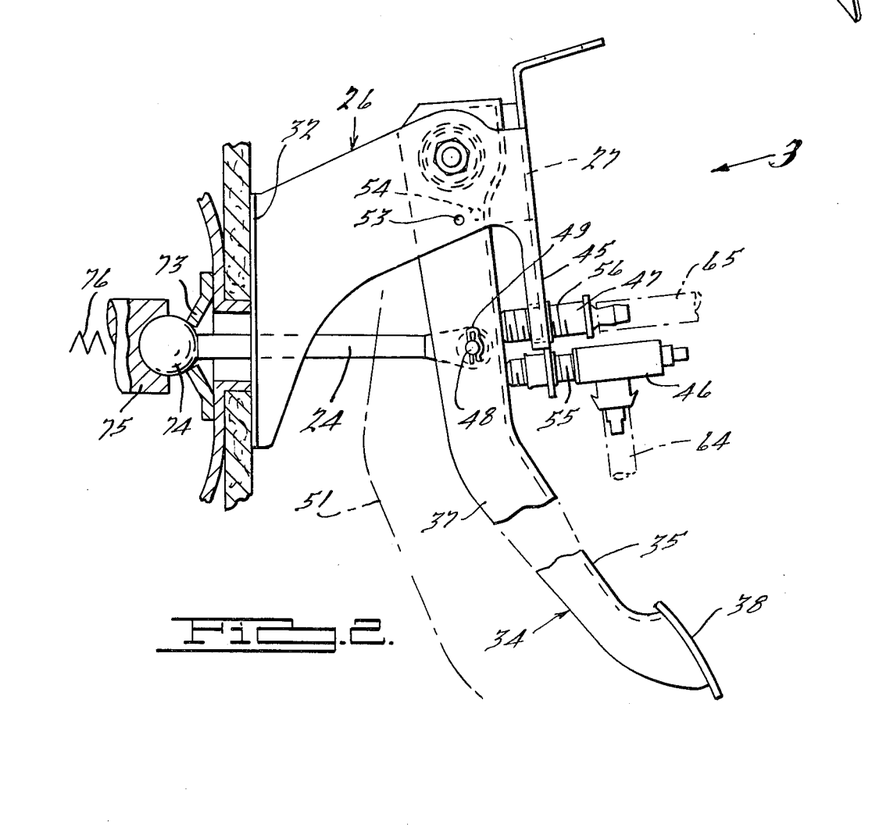
FIG. 2 is a side elevational view of the embodiment of FIG. 1 showing a stop light switch and vacuum release valve carried by the bracket member, the connection to the brake booster assembly being by a one-piece push rod.

In operation of the embodiment of FIG. 4, when the brake pedal lever is in the FIG. 2 position and the operator is not pressing on the pedal, the switch comprising the Press-Ex material and the two contacts 83 and 84 will be open. At this time spring 76 and rubber bushing 43 will be holding the brake pedal rearwardly as determined by stops 73. When the operator presses his foot on pedal surface 82 the two contacts 83 and 84 will be connected, actuating the brake stop light, while at the same time the brake will be actuated. This embodiment has the advantages of pre-assembly and easy installation in the vehicle described with respect to the previous embodiment.

FIG. 5 shows another embodiment of the invention which differs from the embodiment of FIGS. 1 to 3 mainly in that the hinge and resilient means for the brake pedal lever comprises a resilient spring portion of the lever. The pre-assembled module in FIG. 5 is generally indicated at 91 and comprises a firewall mounting bracket 92, a brake pedal lever generally indicated at 93 and a switch 94 and valve 95. The lower portion 97 of brake pedal lever 93 is of rigid construction whereas the upper portion 98 is of leaf spring construction, as in my co-pending application, Ser. No. 945,238 filed Sept. 25, 1978 which in turn is a continuation-in-part of the application which issued as U.S. Pat. No. 4,130,027. The upper portion 99 of the brake pedal lever is looped around a pin 101 secured between the flanges of bracket 92 so as to firmly attach the brake pedal lever to the bracket. Switch 94 and valve 95 are originally in a backed-off position and are carried by a downwardly extending portion 102 of bracket 92.

After the module 91 has been pre-assembled, it will be placed in a fixture and lever 93 forced forwardly (clockwise in FIG. 5) so that spring portion 98 is stressed in a direction urging lever 93 rearwardly. A temporary pin may be inserted in an aperture 103 in bracket 92, holding the lever forwardly of switch 94 and valve 95. These two parts may then be adjusted properly by their threaded mounts as in the previous embodiment, and the module is ready to be installed in the vehicle. As before, a push rod 96 extending from braking system 105 will be connected to lever 93 by a pin 104, although a two piece push rod as shown in FIG. 6 through 10 could be used. Bracket 92 is then secured by bolts 106 to firewall 107 and the temporary pin removed from hole 103 to permit the brake pedal lever 93 to move rearwardly under the urging of spring portion 98 until switch 94 and valve 95 are engaged. At this point stop light switch 94 will be open and valve 95 closed as described above.

Figures 6, 7, 10:
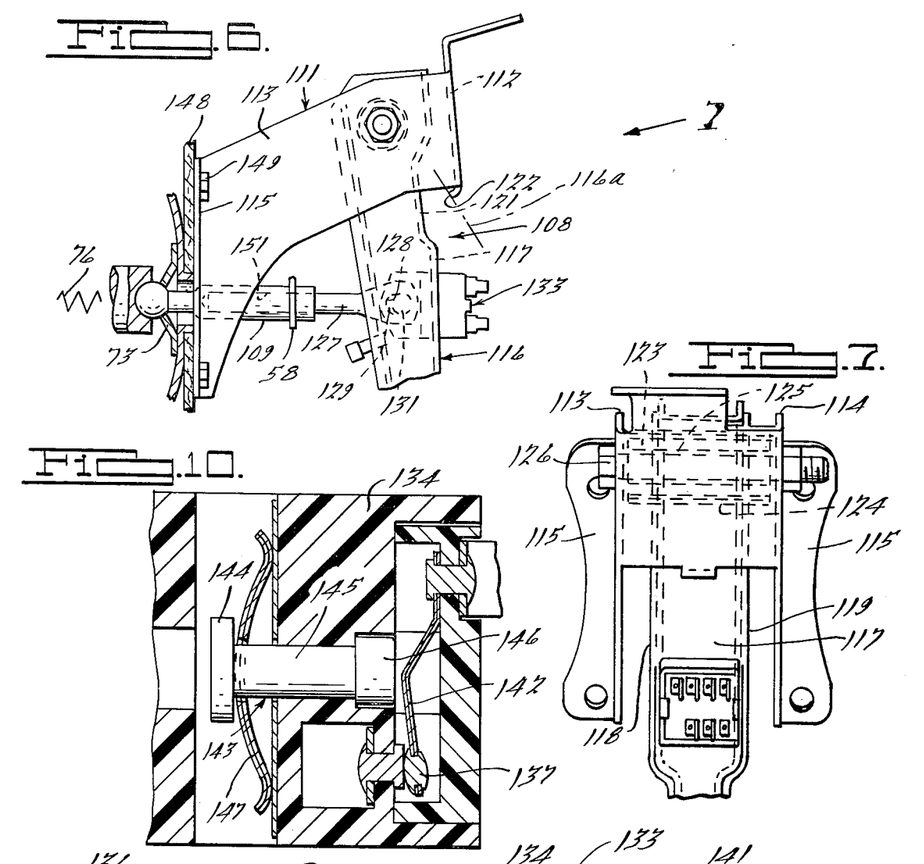
FIG. 6 is a fragmentary side elevational view of yet another embodiment of the invention in which the switches are carried by the pedal lever itself rather than by the bracket, and a two-piece push rod is used.
FIG. 7 is a rear elevational view taken in the direction of the arrow 7 of FIG. 6.
FIG. 10 is a cross-sectional view taken along the line 10—10 of FIG. 9 and showing the manner in which the T-shaped member actuates the normally closed torque convertor lock cut-out switch.

FIGS. 6 through 10 show another embodiment of the invention in which a switch sub-assembly is carried directly by the brake pedal lever rather than by the bracket and is actuated by relative movement between the brake pedal lever and the push rod, which is of conventional two-piece construction. The module, as pre-assembled before installation in the vehicle, is generally indicated at 108 in FIG. 6 although, for purposes of the description, this figure also shows a female section 109 of the push rod. As described above, this actually is part of the brake system assembly already in the vehicle and not part of the module, which has the male section 127. Module 108 comprises a bracket generally indicated at 111 having a web 112 and a pair of flanges 113 and 114 with outwardly bent portions 115 for later securing to the firewall. The brake pedal lever is generally indicated at 116 and is of channel-shaped construction comprising a web 117 and a pair of flanges 118 and 119. The upper portion 121 of web 117 is indented as shown in FIG. 6, and is adapted to co-operate with a forwardly bent stop 122 at the lower end of bracket web 112 to limit rearward swinging of the lever as described below. The lever 116 is secured to bracket 111 by a hinge which also acts as resilient means urging the lever counterclockwise in FIG. 6. This means includes a rubber bushing 123 bonded between an outer sleeve 124 which is part of the brake pedal lever and an inner sleeve 125 which is secured between the flanges 113 and 114 of the bracket by a bolt 126. Sleeve 124 is secured in a rotational position such that rubber bushing 123 will tend to urge lever 116 against stop 122.

Figure 8:
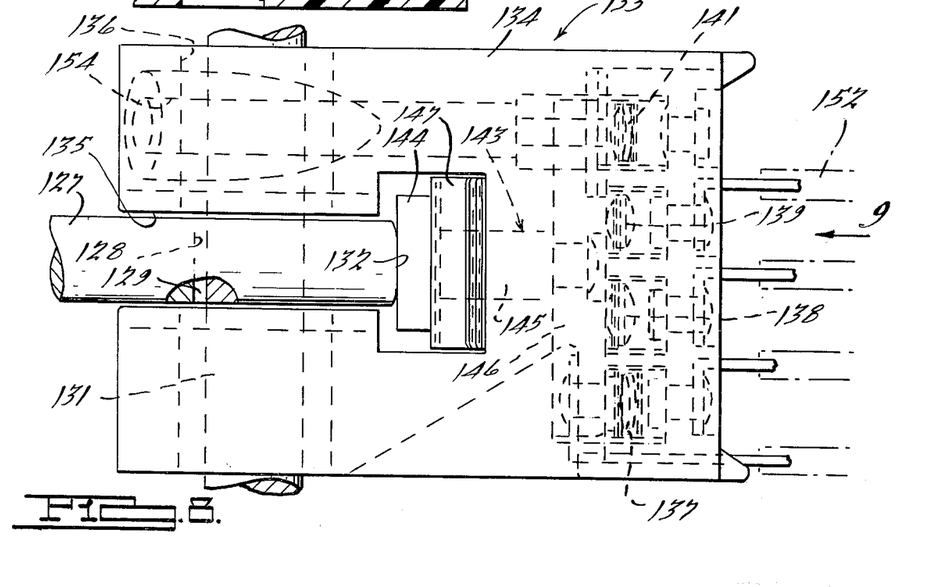
FIG. 8 is a top plan view of the switch showing the T-shaped member actuatable by the push rod.

As mentioned, male section 127 of the push rod also forms part of the pre-assembled module 108. In this embodiment, an elongated hole 128 is formed in the end of push rod section 127 which is attached to lever 116. This leaves a gap 129 between hole 128 and the pin 131 which extends between flanges 118 and 119 and secures push rod section 127 to the brake pedal lever. As seen in FIG. 8, the rearward end 132 of push rod section 127 is movable rearwardly with respect to pin 131 after male push rod section 127 is connected to female section 109, in a manner later described.

The switch sub-assembly is generally indicated at 133 and in the present embodiment comprises three switches and a valve. More particularly the switch sub-assembly has a housing 134 mounted in the web 117 of brake pedal lever 116 and aligned with male push rod section 127. Housing 134 has a slot 135 at its forward end (FIG. 8) within which the rearward portion of male push rod section 127 is disposed. The two portions of housing 134 of opposite sides of slot 135 have aligned clearance apertures 136 for the reception of pin 131.

The rearward portion of housing 134 contains a normally closed torque converter lock cut-out switch 137, a normally open brake stop light switch 138, a normally open cruise control cut-out switch 139 and a normally closed cruise control vacuum release valve 141. A typical construction of a switch is shown in FIG. 10 which illustrates the cut-out switch 137. One contact of this switch is held by a leaf spring 142, and contacts of the other switches are similarly supported, the valve 141 also being supported by a leaf spring.

A T-shaped member generally indicated at 143 is disposed within housing 134 between the end 132 of push rod section 127 and the four leaf spring supports for the three switch contacts and the normally closed poppet valve 141. This T-shaped member has a head 144 in line with section 127 (FIG. 8), a shank 145, and a T-bar 146 which extends across all four spring members 142. A leaf spring 147 is disposed between head 144 and housing 134 (FIG. 10) and tends to hold the T-shaped member 143 in a retracted position so that torque convertor lock cut-out switch 137 is closed, brake light switch 138 is open, cruise control cut-out switch 139 is open and cruise control vacuum release valve 141 is closed.

In operation, module 108 will be pre-assembled at the factory so that, with brake pedal lever 116 unrestrained, its surface 121 will abut stop 122 as held by rubber bushings 123. Bolt 126 will be tightened with the parts in this position and the module may then be shipped to the assembly line. Male push rod section 127 will be partially inserted in female section 109 which is already assembled as part of the vehicle, and held against stops 73 by the braking system spring 76. The bracket 111 is then secured to firewall 148 by bolts 149. Pedal lever 116 is swung clockwise from its dot-dash line position shown partially at 116a in FIG. 6 to its solid line position, against the urging of rubber bushing 123. This will insert male push rod section 127 further into the recess 151 of female push rod section 109, unit the male and female push rod sections may be locked together, for example by any of the systems shown in FIGS. 11 through 14 described below (FIG. 6 shows a cotter pin 58). The rubber bushing 123 will urge lever 116 counterclockwise, pulling the push rod against its stop 73. This will create the gap 129 between the elongated opening 128 of the push rod and pin 131. Spring 147 will thus hold T-shaped member 143 in its left-hand position as shown in FIGS. 8 and 10. Electrical wires 152 may then be attached to the switch terminals as shown in FIG. 8 and a vacuum hose 153 (FIG. 9) attached to the passage 154 in housing 134 leading to valve 141.

In operation, when the operator's foot is not on the brake pedal, the parts will be as shown in FIGS. 8 and 10. As soon as the operator depresses the brake pedal, the push rod section 127 will move to the right in FIG. 8 with respect to housing 134, until gap 129 is taken up. Pushing the T-shaped member to the right will operate the three switches and vacuum valve in the manner described above and of course at the same time swinging of the brake pedal lever will actuate the braking system. When the brake pedal is released, braking system spring 76 will return the push rod to the right against stop 73, but bushing 123 will withdraw lever 116 further, allowing spring 147 to retract T-shaped member 143 and permitting return of the valves and spring to their initial positions.

Because of the simultaneous actuation of the three switches and vacuum valve at the moment brake fluid starts to move in the braking system, the invention offers important safety and engineering advantages. As the vehicle begins to slow down, the brake lights will warn the following car and the torque convertor lock will be disenabled, a safety factor on slippery surfaces and a factor in fuel conservation. The instant disengagement of the cruise control will mean that the engine will not counteract the braking operation.

Figures 9, 11, 12:
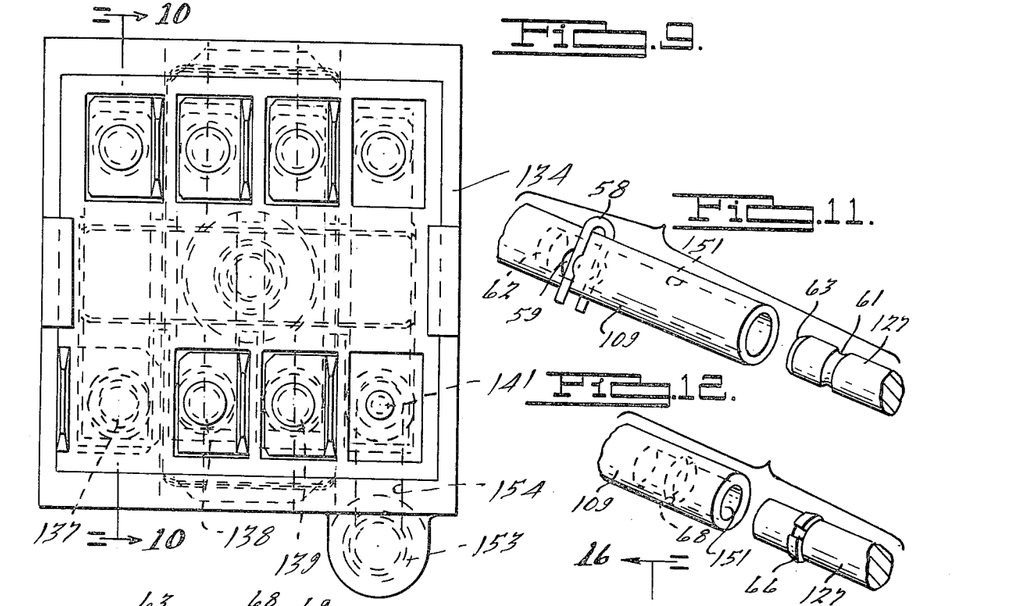
FIG. 9 is a rear elevational view taken in the direction of the arrow 9 of FIG. 8 and showing three switches and a vacuum release valve actuated by the T-shaped member.
FIG. 11 is a fragmentary perspective view showing one embodiment of means for interconnecting the two piece push rod.
FIG. 12 is a fragmentary perspective view showing another manner of interconnecting the push rod sections.

Any of various means may be used for locking the push rod sections together. For example, FIG. 11 shows a U-shaped spring steel pin 58 fitting in oppositely disposed slots 59 in the female member 109 and entering a groove 61 in male member 127. A urethane or other non-metallic button 62 is disposed at the button of recess 151 so as to make the assembly rattle-proof when the end 63 of push rod section 127 abuts the button. Preferably, the tolerances are such that engagement of surface 63 with button 62 will coincide with alignment of slots 61 and slots 59.

Figures 13, 14, 15, 16:
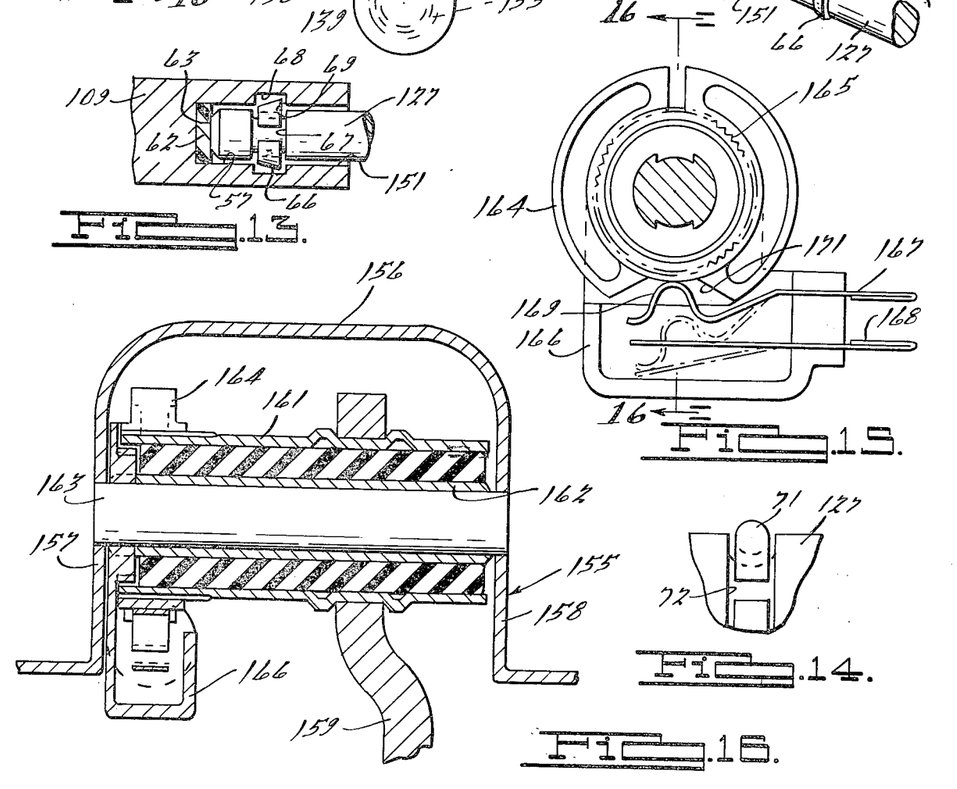
FIG. 13 is a fragmentary cross-sectional view showing the manner in which the tapered washer of FIG. 12 engages the recess shoulder in the forward push rod section.
FIG. 14 is a fragmentary cross-sectional view showing an alternative embodiment of the split washer.
FIG. 15 shows another embodiment of the switch in the form of a pair of contacts actuated by rotary movement of a cam attached to the outer rubber bushing sleeve.
FIG. 16 is a cross-sectional view taken along the line 16—16 of FIG. 15.

FIGS. 12, 13 and 14 show alternative ways of assembling the two push rod sections. In FIGS. 12 and 13, a tapered split washer 66, for example of spring steel, is mounted in a groove 67 on male push rod section 127. A groove 68 is formed within recess 151 having a forwardly facing shoulder 69. The push rod section 127 may be inserted in recess 151, causing contraction of tapered washer 66 until it snaps into position in groove 68. At this time the end 63 of push rod section 127 will abut non-metallic button 62.

Alternatively, as shown in FIG. 14, the split washer may be round in section as indicated at 71. In this case it would reside in a groove 72 in push rod section 127. The action would be the same as with respect to tapered washer 66. That is, the washer would contract as the male section is inserted in the recess 151 and would then snap into position in groove 68.

FIGS. 15 and 16 show rotary switch which can be used in place of the switch 46 shown in FIG. 2. As illustrated, the mounting bracket is indicated generally at 155 and comprises a web 156 and flanges 157 and 158. The brake pedal lever is shown partially at 159 and is secured to an outer sleeve 161. An inner sleeve 162 is secured to the opposite flanges of bracket 156 by a pin 163. A cam 164 is secured to outer sleeve 161 by means of adjusting and locking teeth 165.

A switch housing 166 is secured adjacent cam 164 to sleeve 162 immediately inwardly of flange 157. A pair of contacts 167 and 168 are carried by housing 166. Contact 168 is flat and contact 167 has a loop 169 disposed within a recess 171 in cam 164. The contacts are of spring-like material and the action such that, when brake pedal 159 is rocked to a braking position, contact 169 will be depressed by cam 164 until it engages contact 168.

Among the advantages of the invention is the fact that the resilient means in the module, which constantly urges the brake pedal lever rearwardly, overcomes whatever resistance is present in the lever assembly module and guarantees no brake drag. Thus, the return spring sizes needed in the booster and master cylinder are reduced, with a resultant saving in weight and cost, and a potential reduction in pedal effort. Previously, relatively heavy return springs were needed in these units to return the pedal and reset the switches.

Consistency in pedal effort from car to car is relatively easy to check when using the method of the present invention. When the module is assembled and the spring hinge set at the proper angle and fastened, the force needed for a given angular displacement of the brake pedal lever can be conveniently checked with a leverage device to see whether resistance meets specifications.

Another advantage of the invention is that it facilitates use of a two-piece push rod. This type of push rod, in which the rearward section is pre-assembled to the brake pedal lever as part of the module, eliminates the possibility of disconnection which is present with a one-piece push rod, due to the push rod being improperly fastened to the brake pedal lever on the assembly line. It should be kept in mind, however, that the two-piece push rod must be so constructed that even if the fastener holding the two pieces together should fail, the male section is long enough so that it is captured and cannot be completely withdrawn from the female section. Any servicing of parts comprising the invention can, of course, be handled by replacement of the entire module, thus reducing both inventory costs and the possibility of service error, and ensuring correct pedal alignment.

While it will be apparent that the preferred embodiments of the invention disclosed are well calculated to fulfill the objects above stated, it will be appreciated that the invention is susceptible to modification, variation and change without departing from the proper scope or fair meaning of the subjoined claims.

I claim:
1. In a method for assembly of an automotive brake pedal and switch, the steps of providing a pre-assembled module having a firewall mounting bracket member, a brake pedal lever member hinged thereto, resilient means urging said lever member rearwardly, and a switch carried by one of said members, adjusting said switch so that it will be actuated upon the desired movement of the brake pedal, said adjustment being made prior to mounting of the pre-assembled module upon said firewall, connecting said lever member to a brake system push rod member, mounting said module on a vehicle firewall, and connecting a lead wire to said switch, whereby forward movement of said lever member will actuate said switch.

2. The method according to claim 1, in which said switch is mounted on said bracket member, and further comprising the steps, before said module is mounted or connected to said push rod member, of urging said lever member forwardly, temporarily locking the lever member in place, adjusting said switch with respect to said lever member, and releasing said lever member after said lever and push rod members have been connected and said bracket member has been mounted.

3. The method according to claim 1, in which said switch is mounted on said lever member, and further comprising the step of providing a lost motion connection between said push rod and lever members, whereby said switch will be actuated by relative movement between these two members.

4. The method according to claim 2 or 3, in which the brake system push rod member is provided in two interfitting sections with the forward section being connected to the brake system, further comprising the step of pre-assembling the rearward push rod member section to the module, said step of connecting the lever member to the brake system push rod member comprising the step of interfitting said two sections and fastening them together against separation.

5. In an automotive brake pedal and switch assembly, a pre-assembled brake lever and switch module having a firewall mounting bracket member, a brake pedal lever member hinged thereto, resilient means comprising a rubber bushing bonded between portions of said bracket and lever member for urging said lever member rearwardly, and a switch carried by said bracket member, said lever member having means for connection to a brake system push rod member on a vehicle, whereby forward movement of said lever member after said preassembled module has been mounted on a vehicle firewall and connected to the push rod member will actuate said switch, said switch comprising a stop limiting rearward movement of said lever member.

6. The combination according to claim 5, further provided with a temporary pin connecting said lever and bracket members during pre-assembly so as to hold said lever member forwardly of a position determined by said stop.

7. The combination according to claim 5, further provided with a cruise control cut-out means carried by said bracket member and actuated by forward movement of said lever member.

8. In an automotive brake pedal and switch assembly, a pre-assembled brake lever and switch module having a firewall mounting bracket member, a brake pedal lever member hinged thereto, resilient means urging said lever member rearwardly, a switch carried by one of said members, a push rod member rearward section connected to said lever member during pre-assembly, a push rod member forward section adapted to be connected to a brake system, said two push rod sections having a male-female connection, and means interlocking said push rod sections after they have been assembled.

9. In an automotive brake pedal and switch assembly, a pre-assembled brake lever and switch module having a firewall mounting bracket member, a brake pedal lever member hinged thereto, resilient means urging said lever member rearwardly, a brake pedal carried by said brake pedal lever, and a switch carried by said brake pedal and comprising a pair of contacts embedded in said brake pedal and on opposite sides of a conductive substance, this substance being so shaped that pressure of the operator's foot on the brake pedal will cause the substance to interconnect the two contacts, said lever member having means for connection to a brake system push rod member on the vehicle, whereby forward movement of said lever member after said pre-assembled module has been mounted on a vehicle firewall and connected to the push rod member will actuate said switch.

10. In an automotive brake pedal and switch assembly, a pre-assembled brake lever and switch module having a firewall mounting bracket member, a brake pedal lever member hinged thereto, resilient means urging said lever member rearwardly, said resilient means comprising an upper portion of said brake pedal lever member which is flexible and is secured at one end to said bracket member and at the other end to a rigid portion of the brake pedal lever member, and a switch carried by one of said members, said lever member having means for connection to a brake system push rod member on the vehicle, whereby forward movement of said lever member after said pre-assembled module has been mounted on a vehicle firewall and connected to the push rod member will actuate said switch.

11. The combination according to claim 5, said switch comprising a pair of contacts carried by said bracket member adjacent the hinge of said lever member, and a cam carried by said lever member and engageable with one of said contacts.

12. The combination according to claim 11, further provided with an inner sleeve for said resilient means connected to said bracket member and an outer sleeve connected to said lever member, said cam being carried by said outer sleeve.

13. In an automotive brake pedal and switch assembly, a pre-assembled brake lever and switch module having a firewall mounting bracket member, a brake pedal lever member hinged thereto, a brake pedal carried by said brake pedal lever, resilient means urging said lever member rearwardly, and a switch carried by said brake pedal, said lever member having means for connection to a brake system push rod member on a vehicle, whereby forward movement of said lever member due to the application of pressure by an operator to said brake pedal after said pre-assembled module has been mounted on a vehicle firewall and connected to the push rod member will actuate said switch.

14. In combination, a pre-assembled module comprising a vehicle firewall mounting bracket member, a brake pedal lever member hinged to said mounting bracket member, means interconnecting said members and constantly urging said lever member rearwardly, a switch carried by said lever member, and means adjacent said switch for connecting a brake system push rod with said lever member with lost motion, said pre-assembled module being mountable in a vehicle by securing the bracket member to the vehicle firewall, forcing the lever member forwardly and interconnecting the lever member and push rod with said lost motion connecting means, whereby initial forward movement of said lever member after assembly of said module in the vehicle will cause the push rod to actuate said switch.

15. The combination according to claim 14, said connecting means comprising a rearward push rod section pre-assembled to said module and having an overlapping relation to a brake system push rod which comprises a forward push rod section and means interlocking said push rod sections.

16. The combination according to claim 8 or 15, said interlocking means comprising a U-shaped spring-like member disposed in slots in one section and being receivable by slot means in the other section.

17. The combination according to claim 8 or 15, said forward push rod section having a rearwardly facing recess, a forwardly facing intermediate shoulder in said recess, said rearward push rod section being insertable in said recess, said interlocking means comprising a spring-like washer carried by said rearward push rod section and contractable in response to insertion of the rearward push rod section until it snaps into position in front of said shoulder.

18. The combination according to claim 16, further provided with a non-metallic button on the forward push rod section engageable by the forward end of said rearward push rod section when held by said interlocking means.

19. The combination according to claim 14 or 15, said lost motion connecting means comprising a pin carried by said lever member and extending through an elongated aperture in said push rod, said switch being aligned with said push rod.

20. The combination according to claim 19, said lever member being of channel-shaped construction with a web and flanges, said switch being carried under the web thereof, the rearward end of said push rod being disposed between the flanges of said lever member.

21. The combination according to claim 20, said switch being further provided with a T-shaped member spring-urged toward said push rod and engageable thereby to actuate contacts of said switch.

22. The combination according to claim 21, said switch comprising a brake stop light switch, and a cruise control cut-out switch adjacent said brake stop light switch and actuatable by said T-shaped member.

23. The combination according to claim 21, said switch comprising a brake stop light switch, and a vacuum release valve adjacent said brake stop light switch and actuatable by said T-shaped member.

24. The combination according to claim 23, further provided with a torque converter lock cut-out switch adjacent said brake stop light switch and actuatable by said T-shaped member.

25. In combination, a brake pedal lever swingably mounted on a vehicle firewall, resilient means constantly urging said lever rearwardly, a brake push rod connected at one end to said lever by a lost motion connection, resilient means constantly urging said push rod rearwardly, means limiting rearward movement of said push rod and multiple switch means carried by said brake pedal lever and responsive to relative movement between said brake pedal lever and push rod, whereby initial forward movement of said brake pedal lever will cause said lost motion to be taken up and said push rod to operate said multiple switch means.

26. The combination according to claim 25, said multiple switch means comprising a brake stop light switch and a torque convertor lock cut-out switch.

27. The combination according to claims 25 or 26, said multiple switch means comprising a cruise control vacuum valve.

28. The combination according to claim 25, said lost motion connection comprising a pin-and-slot connection.

29. The combination according to claim 25, 26, or 28, further provided with a switch actuating member having one end engageable by said push rod and the other end engageable with said multiple switch means, and resilient means urging said switch actuating member away from said multiple switch means.

30. The combination according to claim 29, said switch actuating member comprising a T-shaped member.

31. The combination according to claim 25, 26, or 28, said push rod urging means and movement limiting means being part of the vehicle braking system.

* * * * *